United States Patent
Inoue et al.

[19]

[11] Patent Number: 6,155,030
[45] Date of Patent: Dec. 5, 2000

[54] SEALING APPARATUS APPLIED TO A VERTICAL TYPE FORMING, FILLING AND CLOSING MACHINE FOR FLEXIBLE PACKAGE

[75] Inventors: Tatsuo Inoue; Tomoo Hosono, both of Nagareyama, Japan

[73] Assignee: Tokyo Automatic Machinery Works, Ltd., Tokyo, Japan

[21] Appl. No.: 09/333,996

[22] Filed: Jun. 16, 1999

[30] Foreign Application Priority Data

Jun. 16, 1998 [JP] Japan .................................. 10-168486
Feb. 19, 1999 [JP] Japan .................................. 11-041578

[51] Int. Cl.[7] .............................. B65B 9/06; B65B 51/26
[52] U.S. Cl. .......................... 53/552; 53/374.2; 53/374.3; 53/375.9; 53/376.2
[58] Field of Search .............................. 53/550, 551, 552, 53/373.8, 374.2, 374.3, 376.2, 375.9

[56] References Cited

U.S. PATENT DOCUMENTS 4,919,740 4/1990 Kreager ....................................... 53/551
5,561,966 10/1996 English ....................................... 53/551

FOREIGN PATENT DOCUMENTS

| 0381400A2 | 8/1990 | European Pat. Off. . |
| 0611697A2 | 8/1994 | European Pat. Off. . |
| 0872419A2 | 10/1998 | European Pat. Off. . |
| 9420326 | 2/1995 | Germany . |
| 8-318905 | 12/1996 | Japan . |
| Y2258263 | 12/1996 | Japan . |
| 503279 | 4/1939 | United Kingdom . |
| 1189762 | 4/1970 | United Kingdom . |

Primary Examiner—Linda Johnson

[57] ABSTRACT

A sealing apparatus applied to a vertical type flexible package forming, filling and closing machine includes a heater block arranged near a filling tube and having a heating ridge, and a web guide attached to the outer surface of the filling tube and having a pair of guide rails, and the heating ridge cooperates with the pair of guide rails to hold the joint of a traveling package web therebetween in such a manner that the joint is elastically deformed in convex form in cross section, whereby the joint is concentratedly applied with heat and thus is heat-sealed.

8 Claims, 18 Drawing Sheets

SEALING APPARATUS APPLIED TO A VERTICAL TYPE FORMING, FILLING AND CLOSING MACHINE FOR FLEXIBLE PACKAGE

BACKGROUND OF THE INVENTION

1. Field of the Invention

The present invention relates to an apparatus used in a vertical type flexible package forming, filling and closing machine to heat-seal the side edges of a cylindrically formed package web in a feeding direction of the web.

2. Description of the Related Art

Vertical type flexible package forming, filling and closing machines are generally associated with a pinch roller type sealing apparatus as disclosed in Japanese Utility Model Registration No. 2528263, or with a seal belt type sealing apparatus as disclosed in Unexamined Japanese Patent Publication No. 8-318905. The former type sealing apparatus includes two pairs of pinch rollers and a center sealer. The two pairs of pinch rollers are spaced from each other in a vertical direction along a filling tube, and the center sealer is arranged between the upper and lower pairs of pinch rollers. A package web is formed into cylindrical shape on the outer periphery of the filling tube, with side edges thereof forming a joint where the inner faces of the side edges come into plane contact with each other. The joint of the web passes through the center sealer while being held by the upper and lower pairs of pinch rollers, and at this time, the joint is heat-sealed, that is, vertically sealed.

On the other hand, the latter type sealing apparatus has an endless seal belt extending along a filling tube. A package web formed into cylindrical shape on the outer periphery of the filling tube has a joint where side edges thereof overlap each other. The web is fed with its joint held between the seal belt and the filling tube, and in this process the joint is heat-sealed, that is, vertically sealed.

In the former type sealing apparatus, since the joint of the package web passes through the center sealer while being held by the upper and lower pairs of pinch rollers, the sealed joint is inevitably in the form of fin seal and it is not possible to form a lap seal.

With the latter type sealing apparatus including a seal belt, on the other hand, the joint can be sealed in either form of fin seal or lap seal. However, since the joint of the package web is heat-sealed by heat transmitted thereto from a heater block through the medium of the seal belt, it is difficult to control the application of heat to the joint. To make up for a deficiency of heat applied to the joint, therefore, the heating temperature of the heater block needs to be set at high temperature. Also, the seal belt and a drive source therefor make the structure of the vertical sealing apparatus complicated.

SUMMARY OF THE INVENTION

An object of the present invention is to provide an apparatus which is applicable to both fin sealing and lap sealing, is simplified in structure, and capable of reliable and neat sealing of the joint of a package web.

The above object is achieved by a sealing apparatus according to the present invention, which comprises: a heater unit arranged near a filling tube, the heater unit having a heating ridge which extends along the filling tube and with which one face, or a first face, of a joint of a package web comes into sliding contact; and a receiving unit for supporting the joint of the package web, the receiving unit having a pair of guide rails which extends along the heating ridge on opposite sides thereof and with which the other face, or a second face, of the joint comes into sliding contact, the guide rails cooperating with the heating ridge to hold the joint therebetween in a manner such that the joint is elastically deformed toward the guide rails in convex form in cross section.

In the above sealing apparatus, during the feeding of the package web, the joint of the package web is held between the heating ridge and the pair of guide rails while being elastically deformed. In this case, the joint is supported at three points when viewed in cross section. While the joint of the package web is held in this manner, it is applied with heat from the heating ridge of the heater unit, whereupon the joint is heat-sealed. The elastically deformed joint is pushed against the heating ridge due to its own restoring force, whereby the joint and the heating ridge can be satisfactorily brought into close contact with each other. As a result, heat is applied from the heating ridge concentratedly to the joint, thus permitting continuous and stable heat-sealing of the package web. The seal width of the heat seal is determined by the width of a narrow crest of the heating ridge, and the heat seal formed in this case constitutes a seal line. It is, therefore, preferable that the heating ridge should have a generally triangular cross-sectional shape.

No matter whether the joint of the package web is to be heat-sealed in the form of fin seal or lap seal, stable contact of the heating ridge with the first face of the joint of the package web is ensured because the joint is elastically deformed by the heating ridge and the pair of guide rails. This means that the sealing apparatus of the present invention is equally applicable to both fin sealing and lap sealing.

The aforementioned three-point support of the joint greatly reduces the resistance to the feed of the package web. Consequently, no wrinkle is formed in the heat-sealed portion, that is, the vertically sealed portion, of the package web, thus providing a neat vertical seal.

Further, as regards the feed of the package web, the heater unit and the receiving unit are both fixed members, so that a sealing apparatus simplified in structure can be provided.

The receiving unit may be attached to the outer surface of the filling tube, and in this case the sealing apparatus further comprises actuating means for moving the heater unit toward and away from the receiving unit. When the heater unit is in an advanced position, the joint is held between the heating ridge and the pair of guide rails and subjected to the aforementioned elastic deformation. With this arrangement, it is possible to replace the filling tube together with the receiving unit according to the size of packages to be manufactured.

When the heater unit is in the advanced position, the actuating means maintains a predetermined distance between the elastically deformed joint and the filling tube. Thus, the elastically deformed joint and the filling tube do not come into contact with each other but define an air layer therebetween, and this air layer lessens the transmission of heat from the joint to the filling tube.

Preferably, the actuating means includes a positioning element for determining the advanced position of the heater unit. The positioning element accurately determines the position up to which the heating ridge is to advance in between the pair of guide rails, that is, the degree of elastic deformation of the joint.

The guide rails are preferably coupled to each other via a connecting portion disposed in contact with the filling tube. In this case, the pair of guide rails constitutes a single member, facilitating the mounting of the guide rails to the filling tube, and the connecting portion functions as a heat insulating member.

The heater unit may further include a heating band member arranged on a downstream side of the heating ridge in the feeding direction of the package web and extending along the filling tube. The heating band member has a greater contact width for contact with the first face of the joint than the heating ridge. In this case, the receiving unit further includes a flat guide arranged on the downstream side of the pair of guide rails and extending along the filling tube, and the flat guide cooperates with the heating band member to hold the joint of the package web therebetween.

After the aforementioned seal line is formed at the joint of the package web, the joint is further heat-sealed while being held between the heating band member and the flat guide. The heat seal formed in this case constitutes a seal band having a greater width than the seal line.

Formation of the seal band creates large resistance to the feed of the package web. However, since the seal line is already formed at the joint, the joint can smoothly pass between the heating band member and the flat guide, permitting stable formation of the seal band.

The heater unit may include an upstream heater block having the heating ridge and a downstream heater block having the heating band member, and these heater blocks are preferably separated from each other. In this case, the heating ridge and the heating band member are heated independently of each other, so that their heating temperatures can be set to respective optimum values. Further, the heating band member may have at least one groove extending along the filling tube, and in this case a plurality of seal bands are formed at the joint of the package web.

Further scope of applicability of the present invention will become apparent from the detailed description given hereinafter. However, it should be understood that the detailed description and specific example, while indicating preferred embodiment of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

Figure 1:
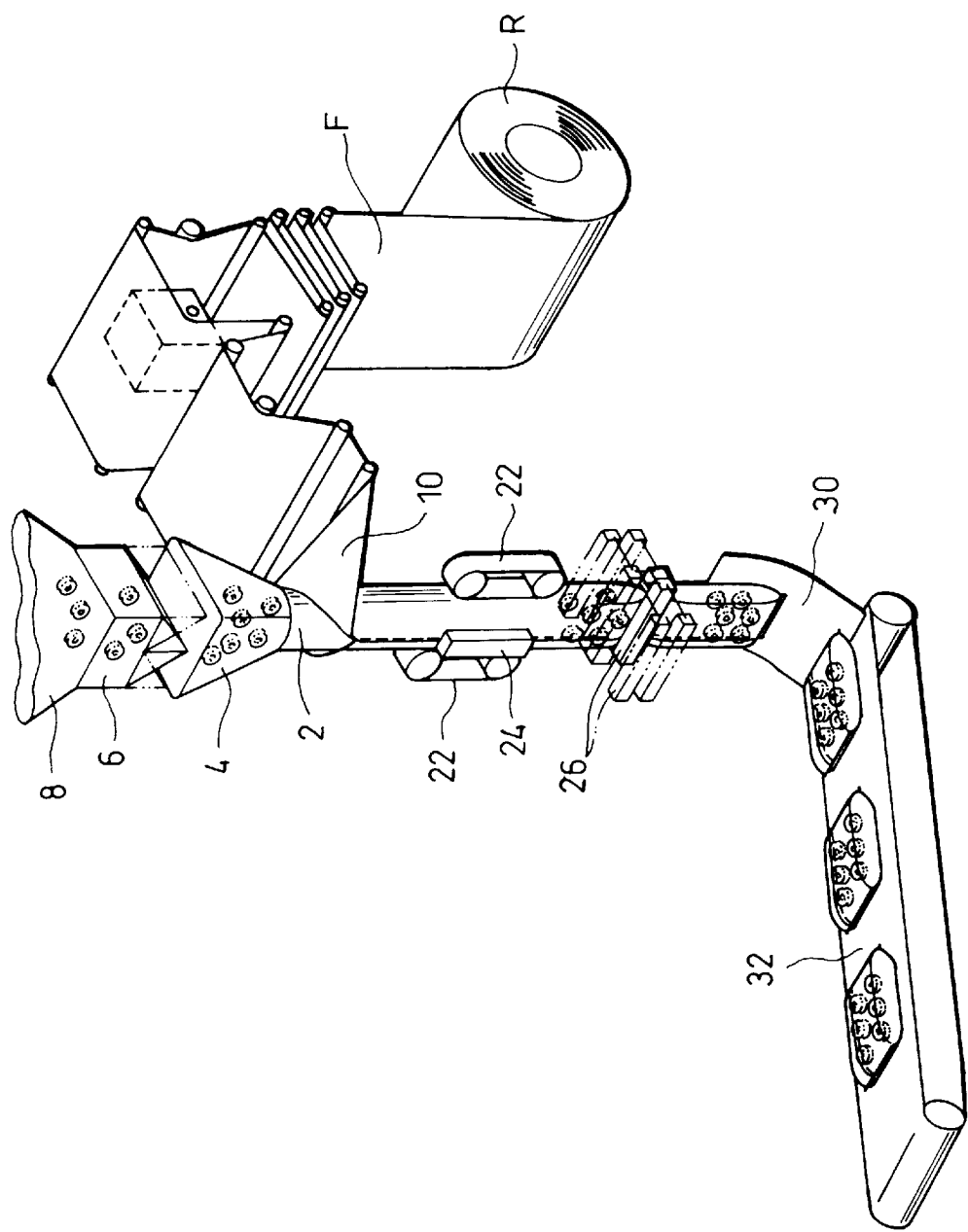
FIG. 1 is a schematic view of a vertical type flexible package forming, filling and closing machine.

Referring to FIG. 1, a vertical type flexible package forming, filling and closing machine has a filling tube 2 extending in a vertical direction and having a relay hopper 4 at an upper end thereof. The relay hopper 4 is connected to a product hopper 8 via a shutter device 6. The product hopper 8 has a meter (not shown) at an upper portion thereof, and the meter stores, for example, a large number of products in bulk. The meter supplies products, a predetermined number at a time, to the shutter device 6 through the product hopper 8. When the shutter device 6 is opened, the products drop from the shutter device 6 into the filling tube 2 through the relay hopper 4.

The filling tube 2 has a former 10 for a package web F located right under the relay hopper 4. The former 10 surrounds the filling tube 2 and is supplied with the package web F. As the package web F passes the former 10, it is formed into a cylindrical shape surrounding the outer periphery of the filling tube 2. The cylindrical package web F is then guided downward along the filling tube 2. The package web F is made of a thermally bondable film and is unrolled from a web roll R.

Figure 2:
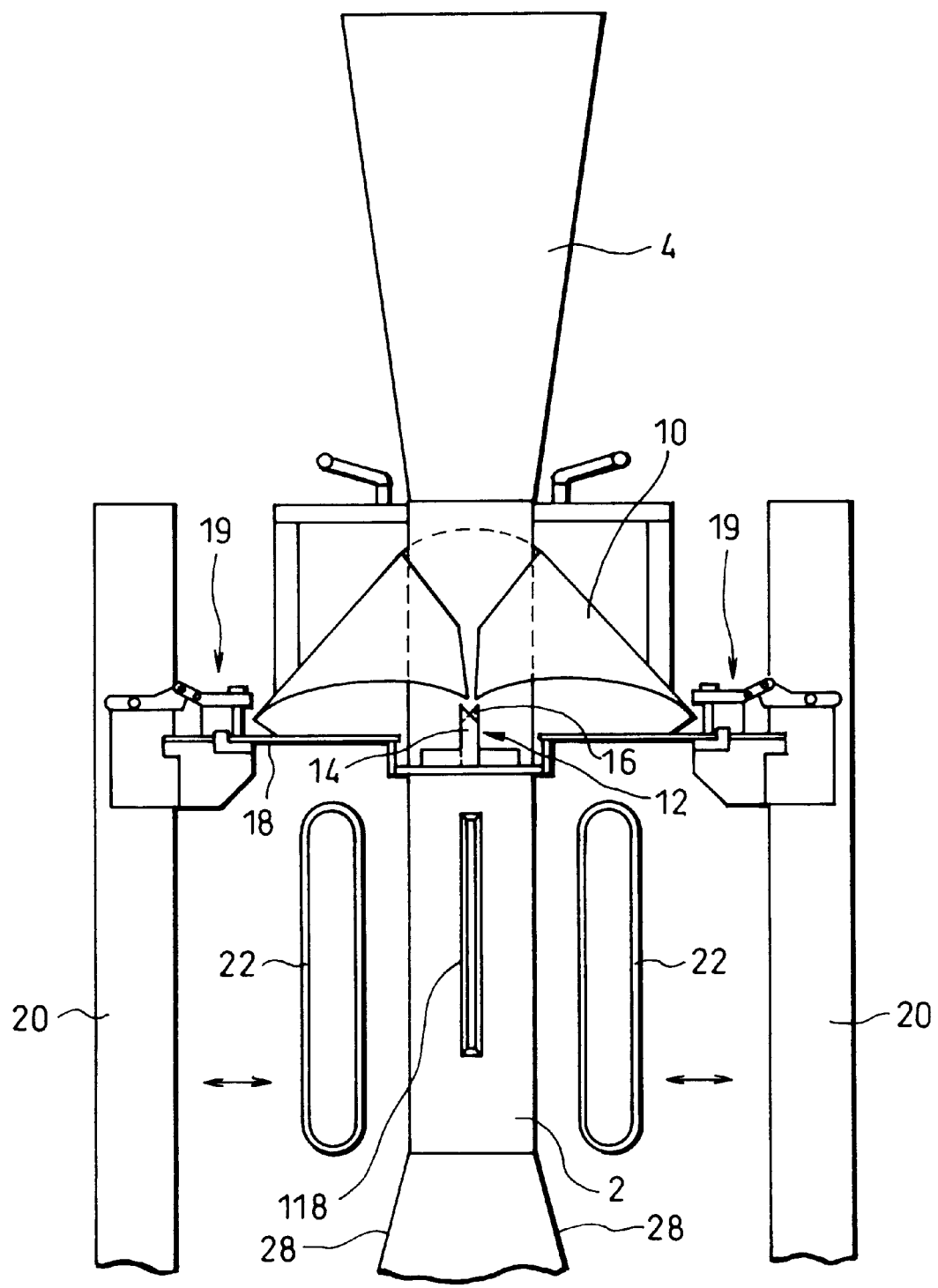
FIG. 2 is an enlarged front view showing part of the machine of FIG. 1.
Figure 3:
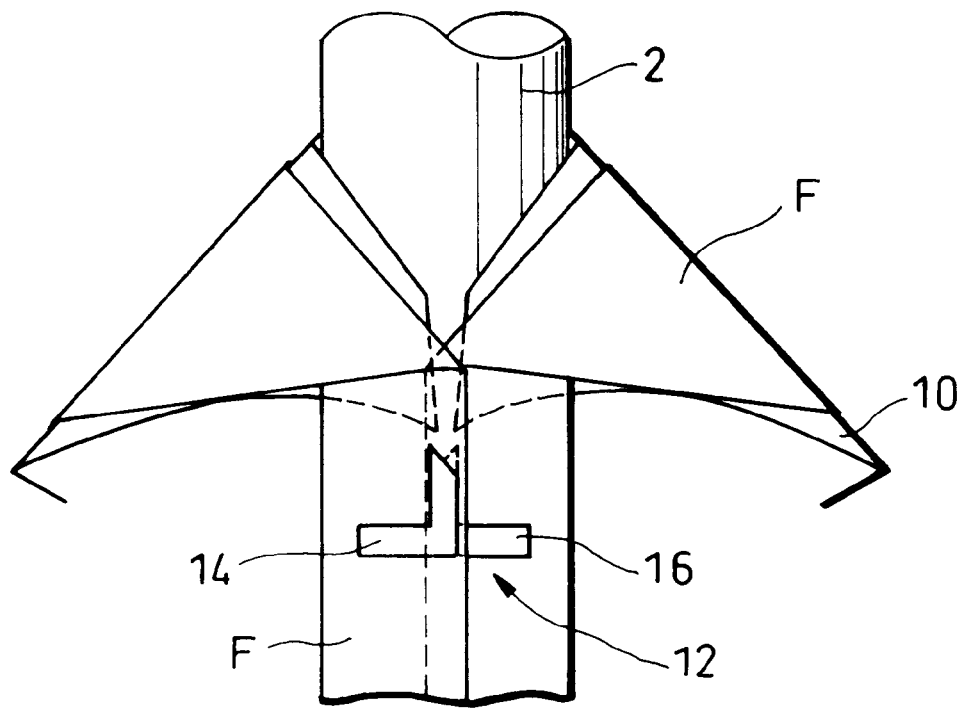
FIG. 3 is a view illustrating the formation of a joint for lap sealing.

The cylindrical package web F has a joint where side edges thereof are brought into plane contact with each other in predetermined form. To form the joint, the machine has a pinch unit 12 right under the former 10. The pinch unit 12, which is arranged in the manner shown in FIG. 2, has a pair of guide pieces 14 and 16 spaced with a predetermined gap therebetween in a diametrical direction of the filling tube 2. As the side edges of the package web F pass through the gap between the guide pieces 14 and 16, they are brought into plane contact with each other, thus forming a joint for lap sealing or fin sealing, whichever is desired. The joint of the package web F formed as shown in FIG. 3 is used for lap sealing.

The filling tube 2, the former 10, and the pinch unit 12 are parts that are interchanged with others according to the width of the package web F, that is, the size of packages to be manufactured. These interchangeable parts are therefore supported on a horizontal mounting base 18. The mounting base 18 is detachably fixed to a frame 20 of the machine via right and left supporting/locking devices 19.

The machine is further provided with endless suction belts 22 arranged on both sides of the filling tube 2. The suction belts 22 are movable toward and away from the filling tube 2. When the suction belts 22 are each in a position advanced toward the filling tube 2, the package web F can be sucked to the suction belts 22. In this case, a certain space is provided between each suction belt 22 and the filling tube 2, so that the suction belts 22 do not come into contact with the filling tube 2 with the package web F therebetween. While in this state, the pair of suction belts 22 is caused to travel in one direction, whereby the package web F is fed downward by the suction belts 22 at a fixed speed along the filling tube 2.

The machine also includes a vertical sealing apparatus 24 arranged in the vicinity of the filling tube 2. In FIG. 1, the vertical sealing apparatus 24 is shown in a simplified manner as a block. When the package web F is fed downward along the filling tube 2, the vertical sealing apparatus 24 heat-seals the joint of the package web F, thereby continuously making the package web F into perfectly cylindrical form. Details of the vertical sealing apparatus 24 will be described later.

Further, the machine is provided with a crosswise sealing apparatus 26 arranged below the filling tube 2. The crosswise sealing apparatus 26 seals the vertically sealed package web F crosswise at predetermined intervals and at the same time cuts the web in the center of each crosswise seal, thereby producing separate packages. The crosswise sealing and cutting of the package web F are performed alternately with the entry of products into the filling tube 2, that is, with the filling of products in the cylindrical package web F. As a result, each package contains products therein. To reliably seal the package web F crosswise, the crosswise sealing apparatus 26 has a pair of, right and left fins 28 (see FIG. 2) at a lower end of the filling tube 2. These fins 28 push the cylindrical package web F wide in a crosswise direction, thereby flattening the web.

The crosswise sealing apparatus 26 includes a chute 30 connected to a belt conveyor 32. The belt conveyor 32 receives individual packages supplied from the crosswise sealing apparatus 26 via the chute 30, and conveys the received packages to a box packing machine (not shown).

Figure 4:
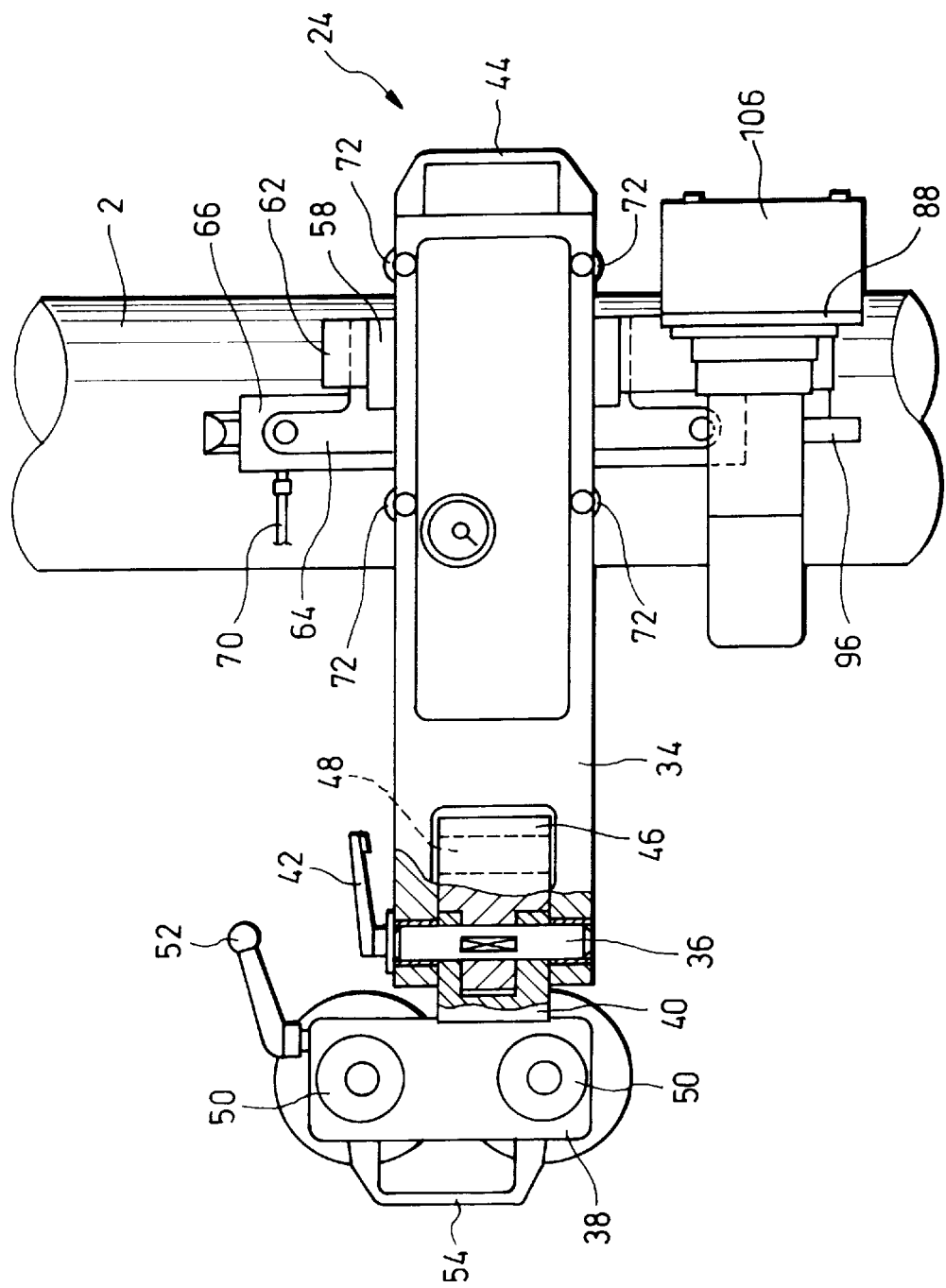
FIG. 4 is a partly broken front view of a sealing apparatus for the machine shown in FIG. 1.

As shown in FIG. 4, the vertical sealing apparatus 24 includes a supporting arm 34 which extends horizontally across the filling tube 2 on the front side, or near side in the figure, of the filling tube. The supporting arm 34 has a base coupled to a slider 38 via a pivot 36. More specifically, the slider 38 has a bracket 40, and the base of the supporting arm 34 is coupled to the bracket 40 via the pivot 36. Consequently, the supporting arm 34 is swingable in a horizontal plane about the pivot 36.

Figure 5:
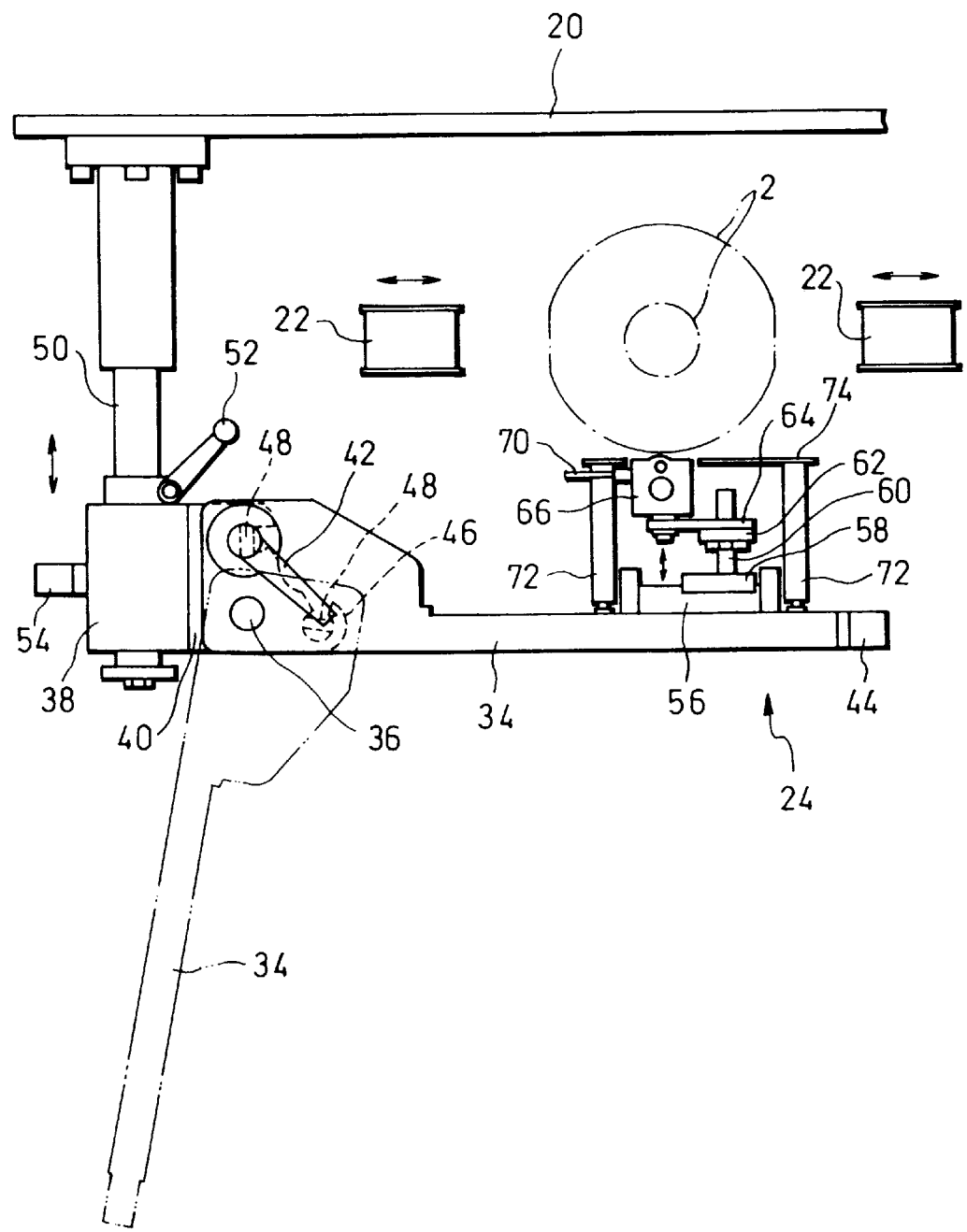
FIG. 5 is a plan view of the sealing apparatus of FIG. 4.

The base of the swingable supporting arm 34 has a first locking mechanism built therein and having a lock handle 42. As the lock handle 42 is turned, the first locking mechanism tightly fastens the base of the supporting arm 34 to the bracket 40, or contrary, releases the tightening. When the supporting arm 34 is released from the tightening, the arm 34 is swingable and thus can be opened and closed with respect to the filling tube 2. Specifically, as shown in FIG. 5, the supporting arm 34 can be swung between a closed position (solid line) at which the arm is situated right in front of the filling tube 2, and an open position (two-dot-chain line). To swing the supporting arm 34, a grip handle 44 can be used which is attached to a distal end of the supporting arm 34.

The bracket 40 has two hooks 46 which respectively determine the closed and open positions of the supporting arm 34. More specifically, the lock handle 42 is provided with a lock shaft 48 having parallel flat surfaces formed on part thereof. The lock shaft 48 rotates as the lock handle 42 is turned, and only when the lock shaft 48 is positioned at a predetermined angle, that is, at a release position, the flat surfaces permit the lock shaft 48 to be inserted into and retracted from a corresponding one of the hooks 46. Thus, after the lock shaft 48 is inserted into the hook 46, it is rotated from the release position, whereupon the supporting arm 34 can be fixed at the closed or open position without fail.

The slider 38 is slidably mounted on a pair of supporting rods 50, the supporting rods 50 being spaced from each other in a vertical direction and extending in a horizontal direction perpendicular to the supporting arm 34 in the closed position (see FIG. 5). The supporting rods 50 have bases thereof secured to the aforementioned frame 20. The slider 38 has a second locking mechanism built therein and including a lock handle 52. As the lock handle 52 is turned, the second locking mechanism tightly fastens the slider 38 to the supporting rods 50, or contrary, releases the tightening. When the slider 38 is released from the tightening, it can slide on the supporting rods 50. A grip handle 54 may be used to slide the slider 38. The slider 38 is slid while the supporting arm 34 is in the closed position, in order to adjust the distance between the supporting arm 34 and the filling tube 2. Such adjustment is required when the filling tube 2 is replaced with another having a different diameter. When the filling tube 2 is to be replaced, the supporting arm 34 is opened as indicated by the two-dot-chain line in FIG. 5. Thus, the supporting arm 34 does not obstruct the replacement of the filling tube 2. In FIG. 5, the filling tubes 2 with maximum and minimum diameters are indicated by the one-dot-chain lines.

The supporting arm 34 has a bracket 56 attached to an inner surface of its distal end portion. The bracket 56 supports a supporting plate 58 extending vertically (see FIG. 6). The supporting plate 58 has upper and lower guide rods 60 extending horizontally toward the filling tube 2. The guide rods 60 extend through a mounting plate 62 and a coupling plate 64 and slidably support these plates 62 and 64 via bearings (not shown). The mounting plate 62 and the coupling plate 64 are located between the supporting plate 58 and the filling tube 2 and extend along the filling tube 2. The coupling plate 64, which overlaps with the mounting plate 62 and is coupled thereto, has an extended portion extending sideways from the mounting plate 62.

The extended portion of the coupling plate 64 supports a heater unit, that is, a heater block 66. The heater block 66 extends vertically along the axis of the filling tube 2. The heater block 66 has a built-in heater which is electrically connected to a power supply control circuit (not shown) via a feeder line 70.

As is clear from FIG. 5, the supporting arm 34 further includes four guard rods 72 attached to its inner surface. The guard rods 72 extend horizontally toward the filling tube 2 and have a guard plate 74 attached to their distal ends. The guard rods 72 and the guard plate 74 prevent the heater block 66 from being accessed carelessly. The guard plate 74 has an aperture through which the heater block 66 can advance toward and recede from the filling tube 2.

Figure 6:
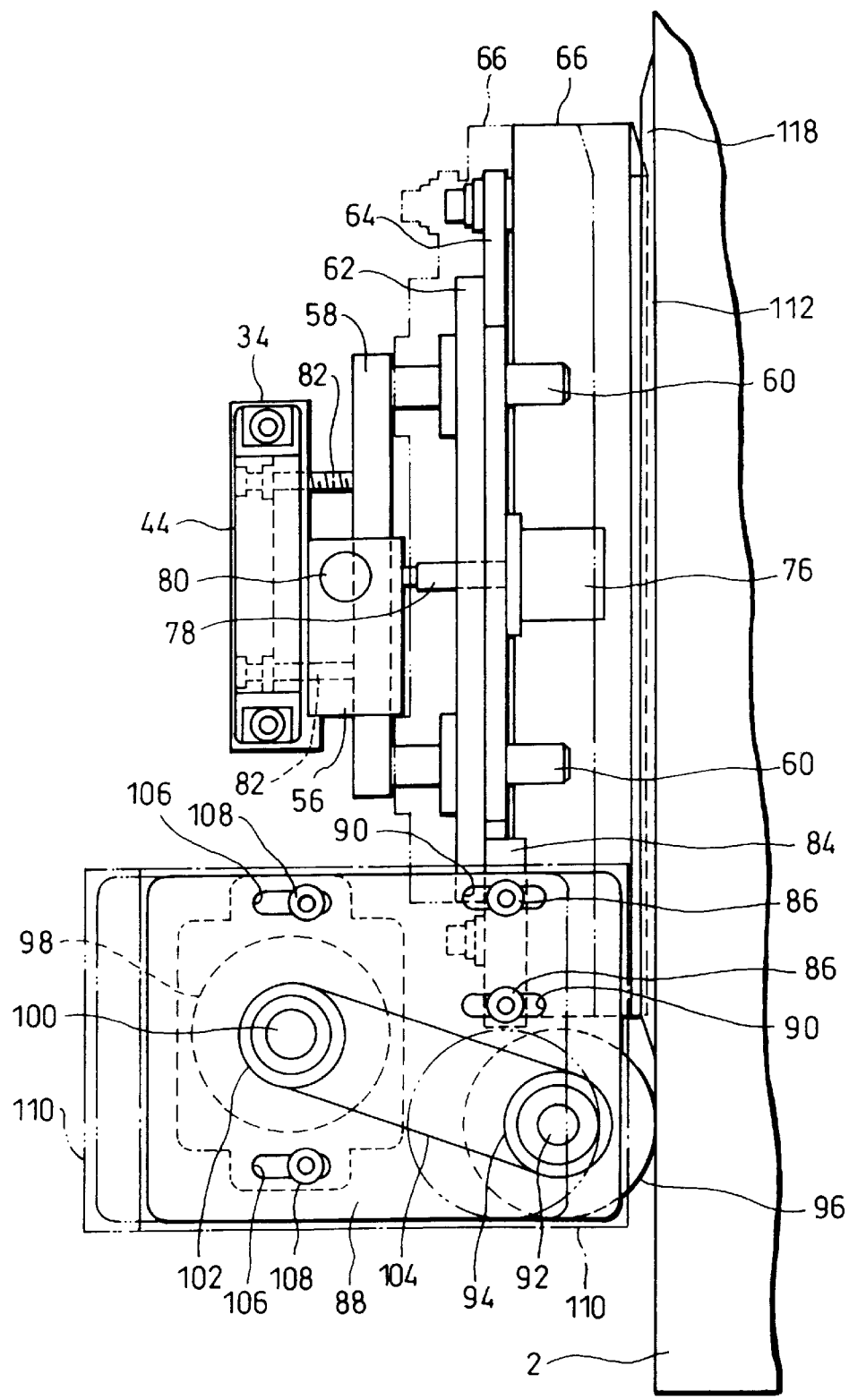
FIG. 6 is an enlarged side view of the sealing apparatus of FIG. 4.

As shown in FIG. 6, the coupling plate 64 supports an air cylinder 76 at a location between the upper and lower guide rods 60. The air cylinder 76 has a piston rod 78, which extends through the coupling plate 64 and the mounting plate 62 and is coupled to the supporting plate 58. The air cylinder 76 is connected to a compressed air source through an air hose and a control valve and is operated by compressed air supplied thereto from the compressed air source. Illustration of a pneumatic circuit associated with the air cylinder 76 is omitted.

As the piston rod 78 of the air cylinder 76 contracts from the state shown in FIG. 6, the mounting plate 62 and the coupling plate 64 move toward the supporting plate 58 while being guided by the upper and lower guide rods 60. In this case, since the heater block 66 is mounted to the coupling plate 64, it recedes from the filling tube 2, as indicated by the two-dot-chain line. Conversely, as the piston rod 78 of the air cylinder 76 extends, the heater block 66 advances closer to the filling tube 2, as shown in FIG. 6.

The aforementioned supporting plate 58 will be explained in more detail. The supporting plate 58 is coupled to the bracket 56 via a horizontal shaft 80 and is rockable about the shaft 80. The supporting arm 34, on the other hand, has upper and lower adjusting bolts 82 fitted in respective threaded holes cut therein and extending toward the supporting plate 58. The adjusting bolts 82 each have a distal end abutted against the supporting plate 58. Thus, as the adjusting bolts 82 are turned, the supporting plate 58 rocks forward or backward about the shaft 80, whereby the parallelism of the heater block 66 with respect to the filling tube 2 can be adjusted.

The mounting plate 62 has a bracket 84 at a lower end thereof, and the bracket 84 supports a plate-like mounting member 88. The mounting member 88 extends along the aforementioned guide rods 60 at a location below the supporting arm 34. A supporting structure for supporting the mounting member 88 by means of the bracket 84 comprises upper and lower horizontal slots 90 cut in the mounting member 88, and mounting bolts 86 fitted through the respective slots 90 and screwed into the bracket 84. The supporting structure permits the gap between the filling tube 2 and the mounting member 88 to be adjusted within a range corresponding to the length of the slots 90.

The mounting member 88 rotatably supports a roller shaft 92. The roller shaft 92 extends through the mounting member 88 and has one end projecting from one surface of the mounting member 88 opposite the heater block 66 and the other end projecting from the other surface of the mounting member 88 on the same side as the heater block 66. The roller shaft 92 is located below the slots 90, that is, at a lower portion of the mounting member 88 near a side edge thereof close to the filling tube 2. A pulley 94 is attached to the aforesaid one end of the roller shaft 92, and a positioning roller 96 is attached to the other end of the roller shaft 92. The positioning roller 96 is arranged right under the heater block 66. More specifically, as will be clear from FIG. 4, the positioning roller 96 is arranged in a vertical plane containing the axes of the heater block 66 and the filling tube 2.

The mounting member 88 further has a servomotor 98 supported on the other surface thereof. The servomotor 98 has an output shaft 100 which projects from the aforesaid one surface of the mounting member 88. The motor output shaft 100 has a pulley 102 attached to a distal end thereof, and this pulley 102 and the aforementioned pulley 94 are connected to each other by an endless belt 104. Accordingly, as the servomotor 98 rotates, the roller shaft 92, that is, the positioning roller 96, is rotated. The peripheral speed of the positioning roller 96 is, for example, 0 to 10% higher than the traveling speed of the package web F fed by the suction belts 22.

A supporting structure for supporting the servomotor 98 by means of the mounting member 88 comprises upper and lower slots 106 and connecting bolts 108, like the aforementioned supporting structure for supporting the mounting member 88 by means of the bracket 84. Thus, the supporting structure for the servomotor 98 permits the interval between the pulleys 94 and 102 to be adjusted within a range corresponding to the length of the slots 106, so that the belt 104 can be given a predetermined tension. Further, a cover 110 is attached to the aforesaid one surface of the mounting member 88 so as to accommodate the pulleys 94 and 102 and the belt 104 therein.

The mounting member 88 is coupled to the mounting plate 62, as mentioned above, and accordingly, when the heater block 66 advances toward or recedes from the filling tube 2, the positioning roller 96 also advances or recedes together with the heater block 66.

Figure 8:
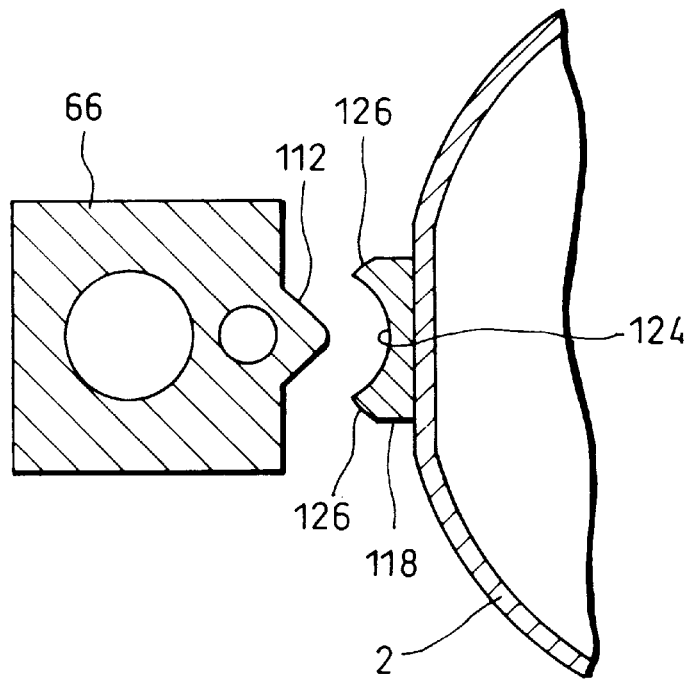
FIG. 8 is a sectional view taken along line VIII—VIII in FIG. 7.
Figure 9:
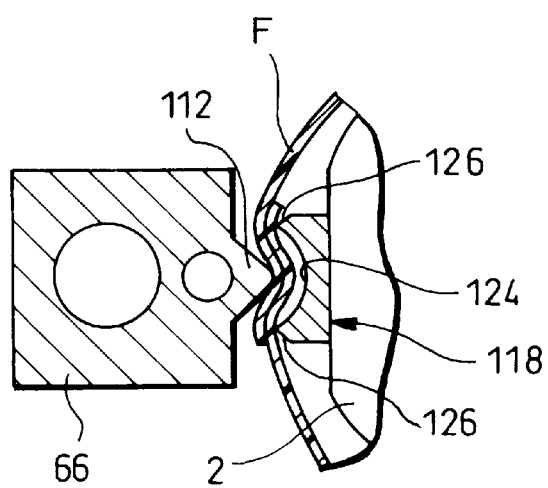
FIG. 9 is a view showing a state in which the joint of a web is sealed in the form of lap seal between a heater block and a web guide shown in FIG. 8.

Referring now to FIGS. 8 and 9, there is illustrated the aforementioned heater block 66 in an enlarged manner. The heater block 66 has a heating ridge 112 as an integral part thereof, and the heating ridge 112 faces the filling tube 2 and extends along the tube 2. The heating ridge 112 is therefore heated together with the heater block 66 and generates heat. The heating ridge 112 has a generally triangular shape in cross section and protrudes toward the filling tube 2. The crested part of the heating ridge 112 is, however, not sharpened but is in the form of an arc with a predetermined radius of curvature in cross section. Further, the heating ridge 112 has inclined surfaces 114 and 116 at upper and lower portions thereof, respectively. A groove is cut on either side of the upper portion of the heating ridge 112 such that the width of the upper inclined surface 114 is reduced by the grooves.

The filling tube 2, on the other hand, has a receiving unit, that is, a web guide 118 made of metal, affixed to the outer peripheral surface thereof. The web guide 118 faces the heating ridge 112 of the heater block 66 and extends along the filling tube 2. More specifically, as clearly shown in FIG. 2, the web guide 118 extends downward from a position right below the aforementioned pinch unit 12 such that the web guide 118 and the pinch unit 12 are in alignment. Accordingly, after the side edges of the package web F pass the pinch unit 12, the joint of the package web F is accurately guided onto the package web guide 118.

Figure 7:
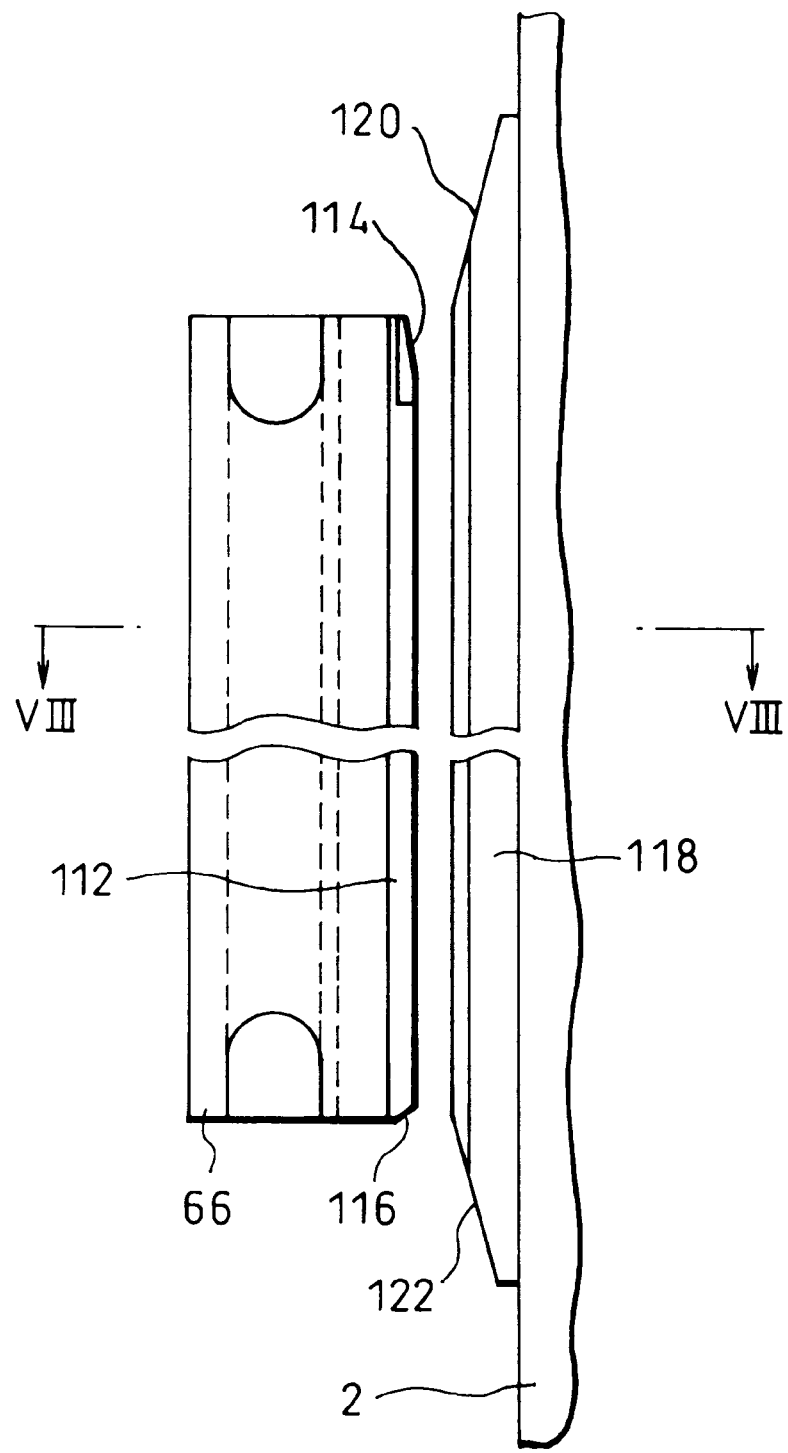
FIG. 7 is an enlarged view showing part of the sealing apparatus appearing in FIG. 6.

Further, as seen from FIG. 7, the upper and lower end portions of the web guide 118 respectively extend beyond the upper and lower ends of the heating ridge 112 and have inclined surfaces 120 and 122. The upper inclined surface 120 serves to smoothly guide in the joint of the package web F onto the web guide 118, while the lower inclined surface 122 serves to smoothly guide out the joint of the package web F.

As shown in FIG. 8, the web guide 118 has a groove 124. The groove 124 has an arcuate form in cross section and extends between the inclined surfaces 120 and 122. Since the groove 124 is cut as illustrated, a pair of guide rails 126 protrudes from side edges of the web guide 118, and the guide rails 126 extend parallel to each other on both sides of the heating ridge 122. The gap between the guide rails 126, that is, the width of the groove 124, is significantly greater than the width of the crested part of the heating ridge 122, and the groove 124 has a sufficient depth relative to the crested part of the heating ridge 122. Accordingly, when the heater block 66 approaches the filling tube 2, the heating ridge 122 comes in between the guide rails 126.

Further, the web guide 118 has an inclined surface on either side thereof such that the width of each guide rail 126 is decreased. The crested part of each guide rail 126 is, however, not sharpened but is in the form of an arc with a predetermined radius of curvature in cross section. The radius of curvature of the crested part of each guide rail 126 is smaller than that of the crested part of the heating ridge 112.

With the vertical sealing apparatus 24 described above, the package web F is unrolled and passes the former 10, whereupon it is formed into a cylindrical shape surrounding the filling tube 2. As the side edges of the package web F pass the pinch unit 12 thereafter, they form a predetermined joint.

The cylindrical package web F is further fed downward along the filling tube 2, so that the joint of the package web F is guided onto the web guide 118. When the package web F is fed in this manner, the aforementioned right and left suction belts 22, the heater block 66, and the positioning roller 96 are located in their respective advanced positions close to the filling tube 2.

When the right and left suction belts 22 are in the advanced position, the suction belts 22 suck the package web F but there is a fixed space provided between the filling tube 2 and each belt 22. When the heater block 66 is in the advanced position, the positioning roller 96 is in contact with the filling tube 2 with the package web F therebetween and the heating ridge 122 protrudes for a predetermined distance in between the pair of guide rails 126 of the web guide 118. Consequently, the joint of the package web F is held between the heating ridge 122 and the pair of guide rails 126, as shown in FIG. 9.

More specifically, when viewed in cross section, the joint is supported at three points by the crest of the heating ridge 112 and the crests of the two guide rails 126. Due to the three-point support, the joint is elastically deformed in such a manner that it is pushed into the groove 124 of the web guide 118. Namely, the joint is elastically deformed toward the filling tube 2 in convexly arcuated form. However, the elastically deformed joint does not come into contact with the bottom of the groove 124 and a predetermined gap is provided between the joint and the bottom of the groove 124.

Since the joint is elastically deformed as mentioned above, a restoring force acts upon the joint in a direction toward the crested part of the heating ridge 112. The restoring force, which arises from elasticity of the package web F per se, serves to reliably bring the joint into close contact with the crested part of the heating ridge 112. The restoring force of the joint can be adjusted by varying the space, or span, between the two guide rails 126.

In order for the predetermined gap to be defined without fail between the elastically deformed joint and the bottom of the groove 124, the crested part of the heating ridge 112 needs to be positioned accurately with respect to the pair of guide rails 126 of the web guide 118. Such positioning of the heating ridge 112 can be easily achieved by bringing the positioning roller 96 into contact with the filling tube 2 with the joint of the package web F therebetween. Namely, the advanced position of the heating ridge 112, that is, the heater block 66, is accurately determined as soon as the positioning roller 96 comes into contact with the filling tube 2, and as a consequence, the heating ridge 112 is accurately positioned with respect to the pair of guide rails 126.

With the individual elements positioned in this manner, the right and left suction belts 22 are caused to travel in one direction with the positioning roller 96 rotated, whereupon the cylindrical package web F is fed downward at fixed speed. While the package web F is fed downward, that is, while the joint of the package web F passes between the heating ridge 112 of the heater block 66 and the pair of guide rails 126, heat is applied from the heating ridge 112 to the joint of the package web F, so that the joint is continuously heat-sealed, that is, vertically sealed. In this case, since the crest of the heating ridge 112 has a small width, the vertical seal obtained is in the form of a lap seal with a small seal width.

Thus, the crested part of the heating ridge 112 is merely brought into contact with the joint for vertical sealing, whereby the joint can be vertically sealed with simple structure.

Since heat is applied from the crested part of the heating ridge 112 concentratedly to the joint, the thermal efficiency for heat sealing is high, permitting the seal width of the vertical seal to be reduced, that is, permitting a seal line to be formed at the joint.

During the vertical sealing, the joint is supported only at three points as mentioned above, and therefore, the sliding resistance of the joint is small, thus greatly reducing the feeding load of the package web F. Consequently, the package web F can be fed stably.

The heating ridge 112 and the guide rails 126 are worn off little by the joint and thus require no replacement.

The three-point support of the package web F serves to maintain a gap between the joint of the package web F and the bottom of the groove 124 of the web guide 118. Air in the gap acts as a heat insulating air layer, so that heat transmitted from the heating ridge 112 to the filling tube 2 through the joint is greatly reduced. As a result, the interior of the filling tube 2 is prevented from being overheated, and accordingly, even if the products dropped through the filling tube 2 are those which are readily melted by heat, such as chocolate, a situation where the products melt on receiving heat from the inner surface of the filling tube 2 does not arise. In view of this, the web guide 118 is preferably made of a material having high wear resistance and excellent heat insulating properties.

After the vertical sealing, the joint of the package web F is temporarily held between the positioning roller 96 and the filling tube 2, and the temporary hold of the joint serves to enhance the accuracy of and stabilize the continuous guiding of the joint in between the heating ridge 112 and the web guide 118. The positioning roller 96 is rotated at a peripheral speed slightly higher than the feeding speed of the package web F, and therefore, the feed of the package web F can be further stabilized.

Figure 10:
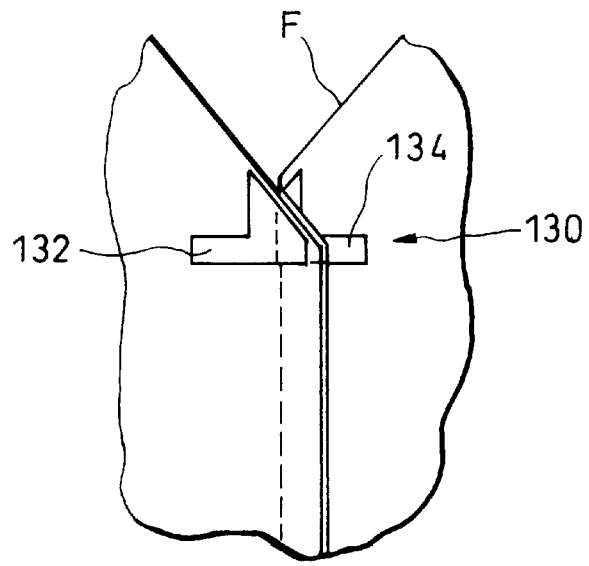
FIG. 10 is a view illustrating the formation of a joint for fin sealing.
Figure 11:
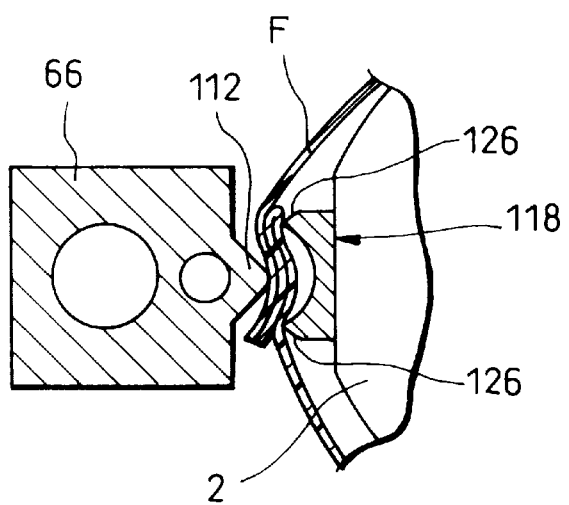
FIG. 11 is a view showing a state in which the joint of a web is sealed in the form of fin seal between the heater block and the web guide shown in FIG. 8.

In the embodiment described above, the joint is sealed in the form of a lap seal, but it may alternatively be sealed in the form of a fin seal. In this case, the aforementioned pinch unit 12 is replaced with a pinch unit 130 shown in FIG. 10. The pinch unit 130 also has a pair of guide pieces 132 and 134, which pair brings the inner faces of the side edges of the package web F into contact with each other to form a joint and folds the joint over the cylindrical portion of the package web F, as shown in FIG. 11. The joint is then guided in between the heater block 66 and the web guide 118, is supported at three points by the heating ridge 112 and the pair of guide rails 126, and elastically deformed as in the case of the aforementioned lap sealing. As the joint elastically deformed in this manner passes between the heating ridge 112 and the pair of guide rails 126, it is heat-sealed, that is, vertically sealed, with heat applied thereto from the heating ridge 112. The vertical seal obtained in this case is in the form of a fin seal.

Figure 12:
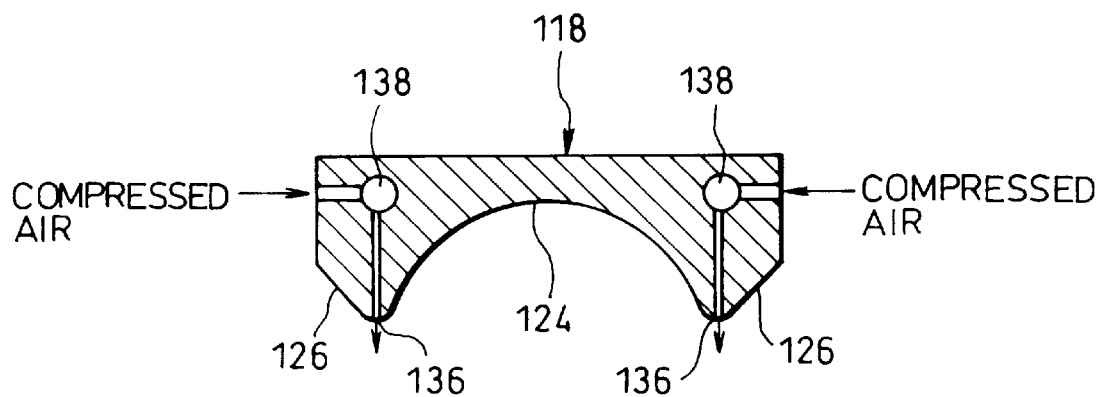
FIG. 12 is a sectional view showing a modification of the web guide.

To vertically seal the joint, a web guide 118 shown in FIG. 12 may also be used. Each guide rail 126 of the web guide 118 has a slit 136 at its crest, and the slit 136 extends in the longitudinal direction of the corresponding guide rail 126. The web guide 118 also has two passages 138 formed therein. The passages 138 communicate with the respective slits 136 and can also be connected to an external compressed air supply circuit through hoses. When compressed air is supplied from the supply circuit to the individual passages 138 of the web guide 118, it is ejected from the slits 136. Such ejection of compressed air provides a pneumatic bearing between each guide rail 126 and the joint, and the pneumatic bearings further reduce the sliding resistance of the joint with respect to the guide rails 126.

Figure 13:
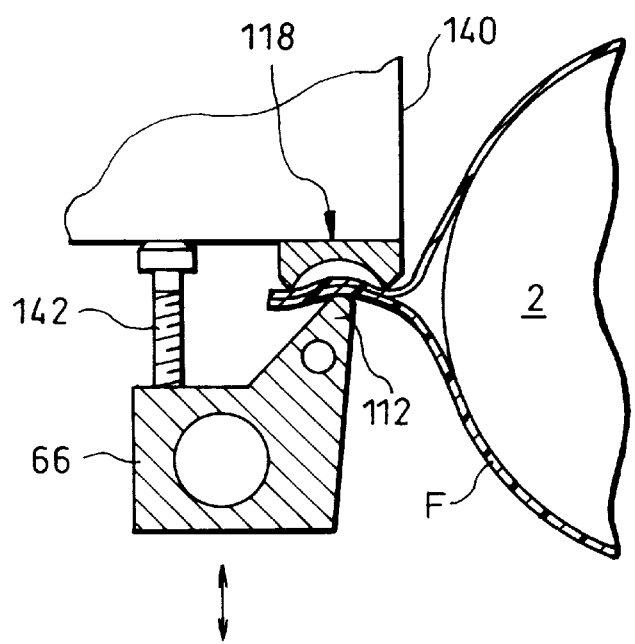
FIG. 13 is a cross-sectional view showing a modification of the sealing apparatus.
Figure 14:
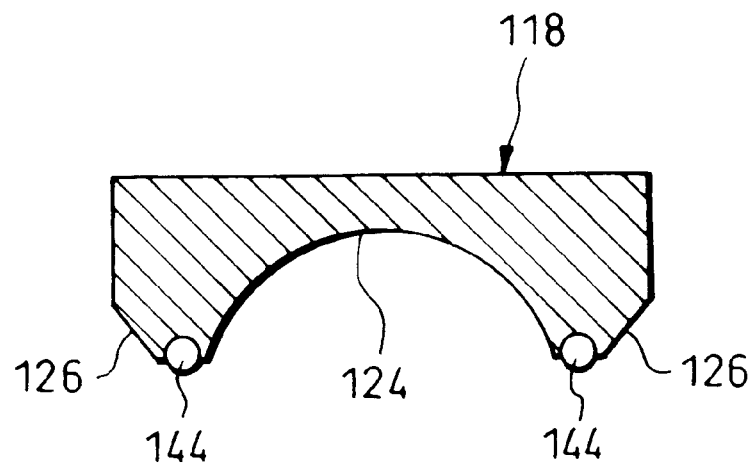
FIGS. 14 and 15 are sectional views showing further modifications of the web guide.

In the above embodiment, the web guide 118 is fixed to the outer peripheral surface of the filling tube 2. Alternatively, the web guide 118 may be arranged at a distance from the filling tube 2, as shown in FIG. 13. In this case, the web guide 118 is mounted on the supporting arm 34 via a bracket 140 and the heater block 66 has a stopper 142 protruding toward the bracket 140. The stopper 142 comprises an adjusting bolt or the like and thus the length of protrusion thereof is adjustable. When the joint is to be heat-sealed, the distal end of the stopper 142 is abutted against the bracket 140, whereby the heating ridge 112 can be positioned accurately with respect to the web guide 118. In this case, the aforementioned positioning roller 96 is unnecessary because its function is accomplished by the stopper 142.

Where the web guide 118 is arranged separately from the filling tube 2, a ball bearing row 144 may be provided at the crested part of each guide rail 126, as shown in FIG. 14. Like the aforementioned pneumatic bearings, the ball bearing rows 144 serve to further reduce the sliding resistance of the joint. In cases where the web guide 118 and the filling tube 2 are separate members, the web guide 118 can be used in common for filling tubes 2 of different sizes.

Figure 15:
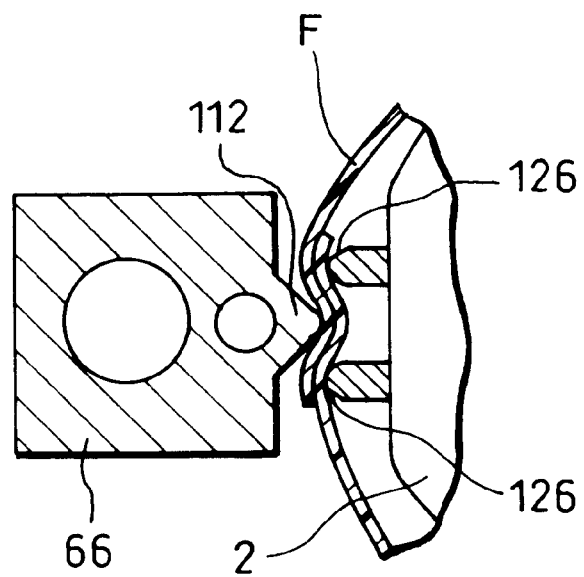

Further, the pair of guide rails 126 may be directly attached to the outer surface of the filling tube 2 or the bracket 140. FIG. 15 illustrates a filling tube 2 having a pair of guide rails 126 attached thereto.

Figure 16:
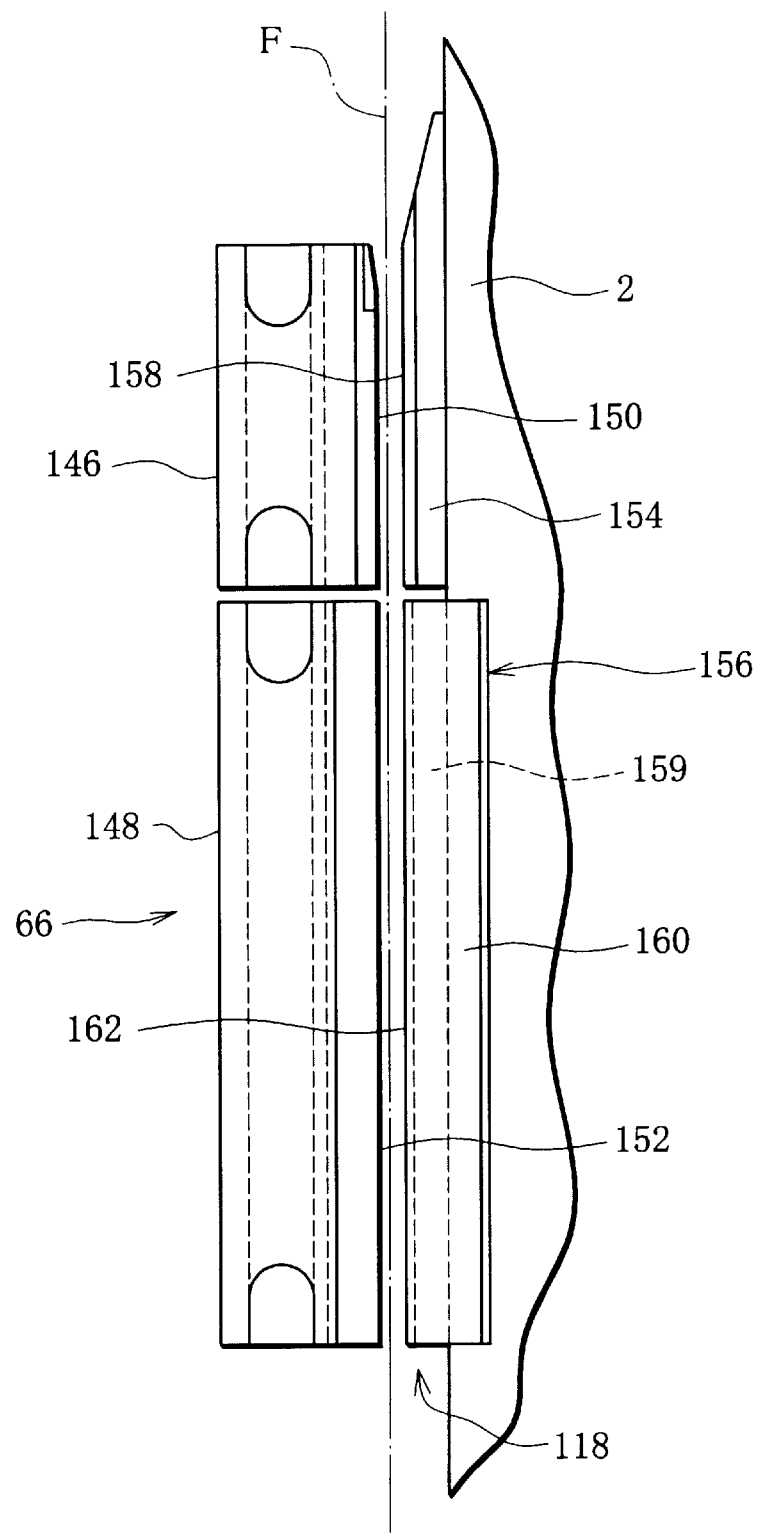
FIG. 16 is a schematic side view showing a divided-type sealing apparatus.

In the foregoing embodiments, the heater block 66 comprises a single member. Alternatively, as shown in FIG. 16, the heater block 66 may be divided into an upstream block part 146 and a downstream block part 148 longer than the upstream block part 146. In this case, the upstream and downstream block parts 146 and 148 each have a heater built therein and the heating temperatures thereof can be controlled independently of each other. Like the heater block 66, the upstream and downstream block parts 146 and 148 are mounted to the aforementioned coupling plate 64 and can be moved together toward and away from the filling tube 2.

The upstream block part 146 has a cross-sectional structure similar to that of the upstream-side portion of the aforementioned heater block 66. Specifically, the upstream block part 146 has a heating ridge 150 similar to the aforementioned heating ridge 112 but the length of the heating ridge 150 is smaller than that of the heating ridge 112.

The downstream block part 148 has a heating band portion 152. The heating band portion 152 projects toward the filling tube 2 and extends along the entire length of the downstream block part 148. The heating band portion 152 is arranged in alignment with the heating ridge 150 of the upstream block part 146 and has a width considerably greater than that of the heating ridge 150.

On the other hand, the web guide 118 also is divided into an upstream guide part 154 made of metal and a downstream guide part 156 longer than the upstream guide part 154, and the guide parts 154 and 156 are attached to the outer surface of the filling tube 2. The upstream guide part 154 faces the upstream block part 146 and has a structure similar to that of the upstream-side portion of the aforementioned web guide 118. Namely, the upstream guide part 154 has a pair of guide rails 158 similar to the aforementioned pair of guide rails 126, and these guide rails 158 can support the joint of the package web F at three points in cooperation with the heating ridge 150 of the upstream block part 146.

Figure 17:
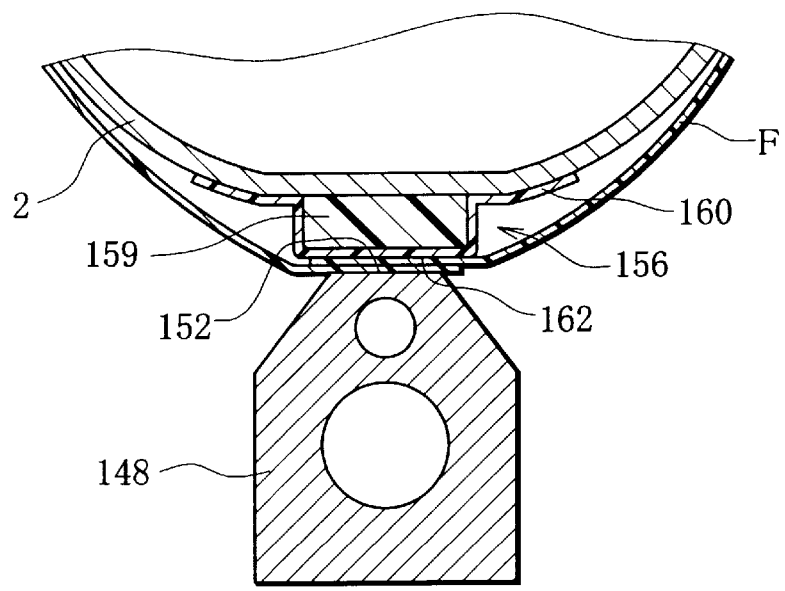
FIG. 17 is a view showing the formation of a lap seal by the sealing apparatus shown in FIG. 16.

The downstream guide part 156 extends along the downstream block part 148 and, as illustrated in FIG. 17, includes a guide plate 159 made of silicone sponge and an adhesive tape 160 fixing the guide plate 159 to the filling tube 2. The adhesive tape 160 is made of a synthetic resin which is excellent in heat resistance and wear resistance, and covers the guide plate 159.

Figure 18:
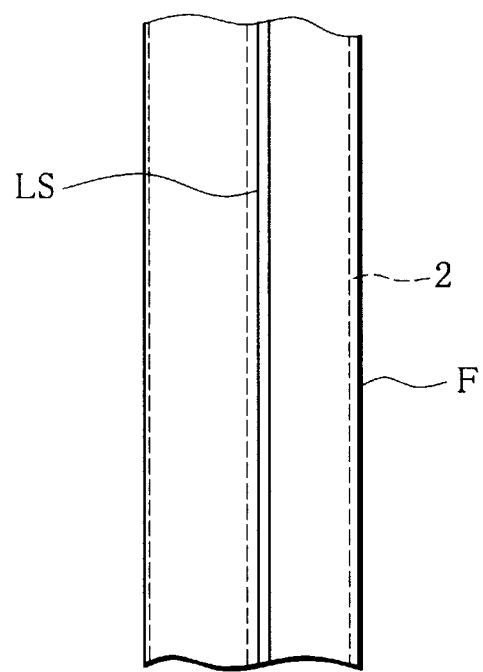
FIG. 18 is a view showing a seal line of a lap seal.
Figure 19:
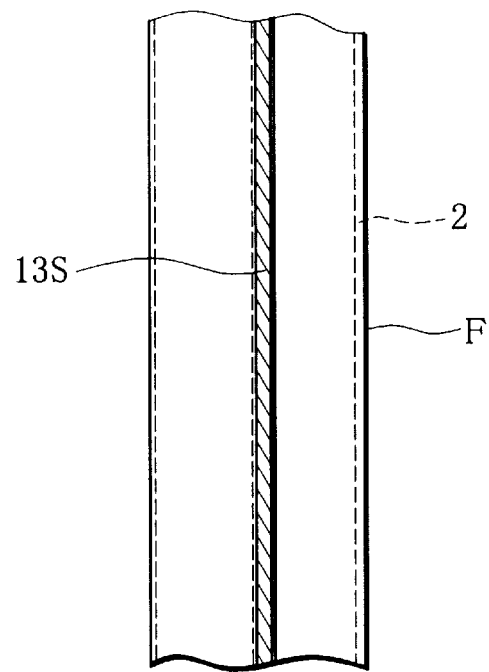
FIG. 19 is a view showing a seal band of a lap seal.

The downstream guide part 156 has a flat guide surface 162 facing the heating band portion 152 of the downstream block part 148, and the flat guide surface 162 has a greater width than the heating band portion 152.

Where each of the heater block 66 and the web guide 118 is of the divided type as described above, the joint of the package web F first passes between the upstream block part 146 of the heater block 66 and the upstream guide part 154 of the web guide 118. At this time, the joint is supported at three points by the heating ridge 150 and the pair of guide rails 158 while being elastically deformed, and a seal line SL is formed at the joint as shown in FIG. 18. Subsequently, the joint passes between the downstream block part 148 of the heater block 66 and the downstream guide part 156 of the web guide 118. At this time, the joint is held between the heating band portion 152 and the flat guide surface 162 and is heat-sealed with heat applied thereto from the heating band portion 152. In this case, since the width of the heating band portion 152 is greater than that of the heating ridge 150, a seal band wider than the seal line SL is formed at the joint as a heat seal. The seal band SB, which is a heat-sealed region indicated by hatching in FIG. 19, is formed over the seal line SL.

Forming the seal band SB at the joint creates large resistance to the feed of the package web F. However, since the seal line SL is already formed at the joint and also the flat guide surface 162 is formed of synthetic resin, the coefficient of friction of the flat guide surface 162 is small. Consequently, the joint can smoothly and stably pass between the heating band portion 152 and the flat guide surface 162 and never wrinkles. It is therefore possible to form a neat seal band SB at the joint as a vertical seal.

Figure 20:
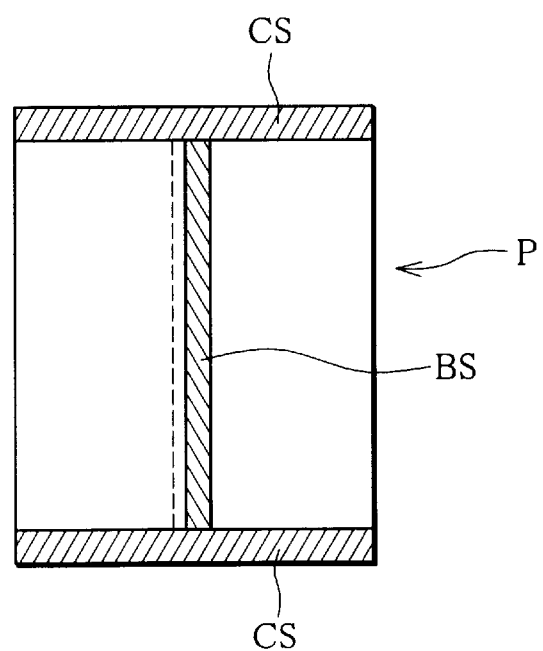
FIG. 20 is a front view of a package having a lap seal.

After the vertical sealing described above, the cylindrical package web F is subjected to crosswise sealing to obtain a package P as shown in FIG. 20. The vertical seal of the illustrated package P is a lap seal and the crosswise seal regions are indicated at CS in FIG. 20.

Figure 21:
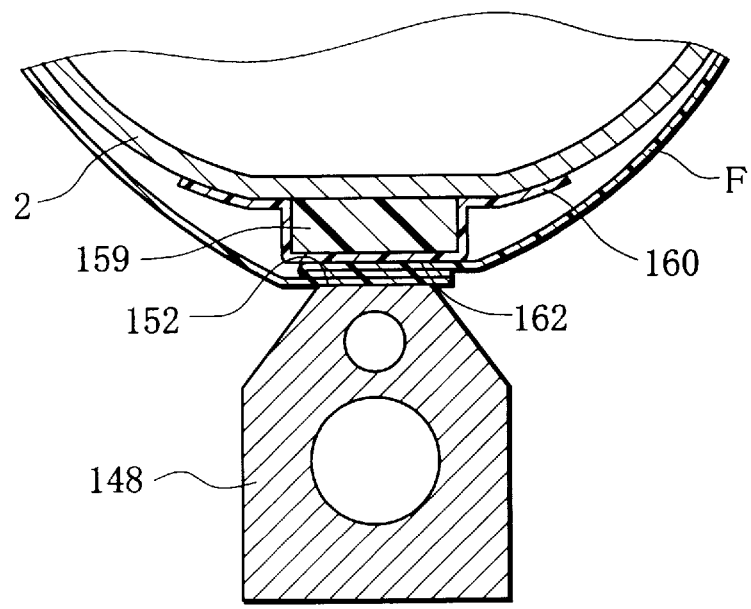
FIG. 21 is a view showing the formation of a fin seal by the sealing apparatus shown in FIG. 16.
Figure 22:
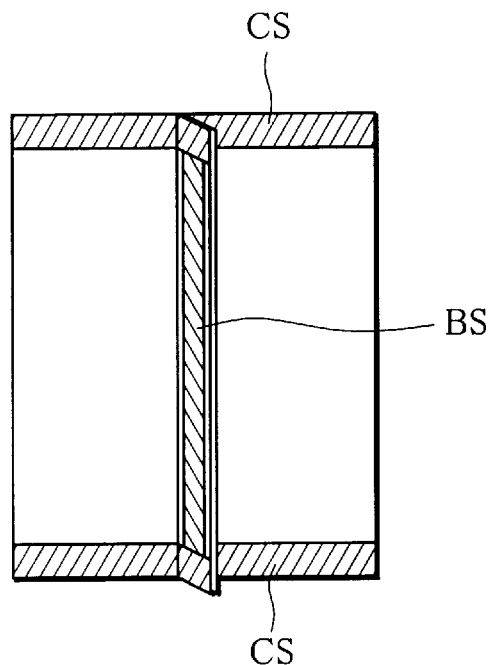
FIG. 22 is a front view of a package having a fin seal.

As seen from FIGS. 21 and 22, the heater block 66 and the web guide 118, each of the divided type, are capable of heat-sealing the joint of the package web F in the form of a fin seal.

Figure 23:
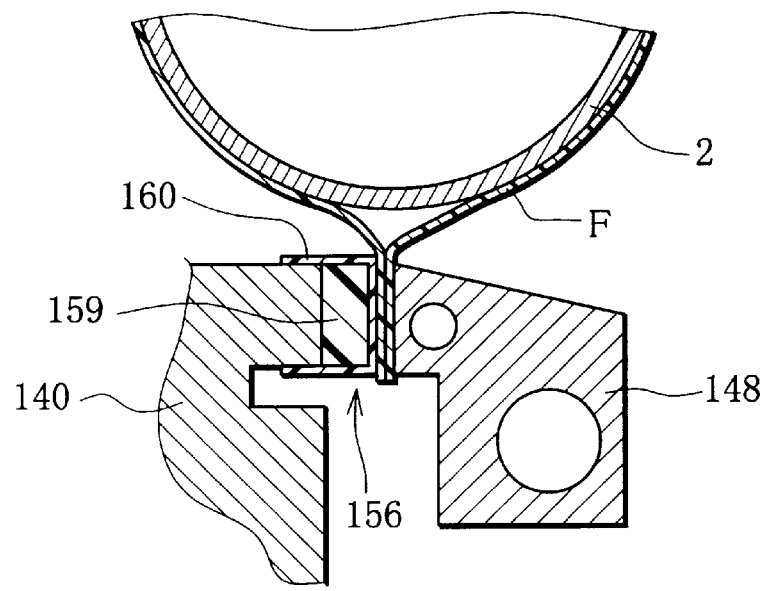
FIGS. 23 and 24 are cross-sectional views showing modifications of the divided-type sealing apparatus.

The divided-type web guide 118 also can be arranged at a distance from the filling tube 2, as shown in FIG. 23. FIG.

23 shows only the downstream guide part 156 of the web guide 118 and the downstream block part 148 of the heater block 66.

Figure 24:
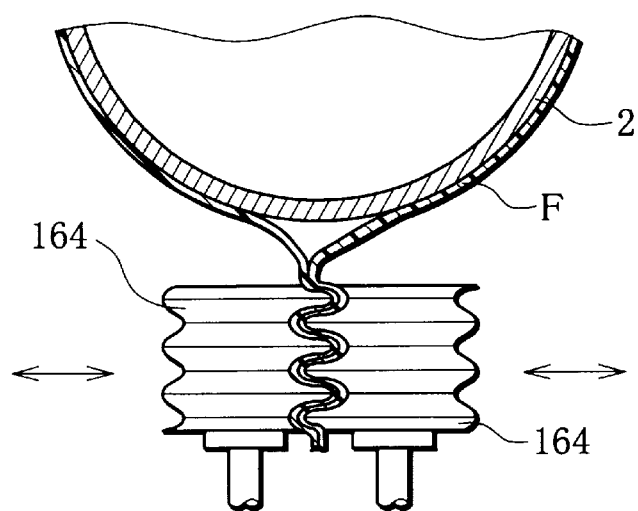

Further, as shown in FIG. 24, where a fin seal is to be formed at the joint of the package web F, the joint may be passed between a pair of corrugating rollers 164 after being vertically sealed. The corrugating rollers 164 are rotated at a peripheral speed slightly higher than the feeding speed of the package web F and are movable toward and away from each other, as indicated by the arrows in FIG. 24. The corrugating rollers 164 each have a plurality of circumferential grooves on an outer peripheral surface thereof and can mesh with each other with the vertically sealed joint interposed therebetween. Consequently, the joint is corrugated as it passes between the pair of corrugating rollers 164.

Figure 25:
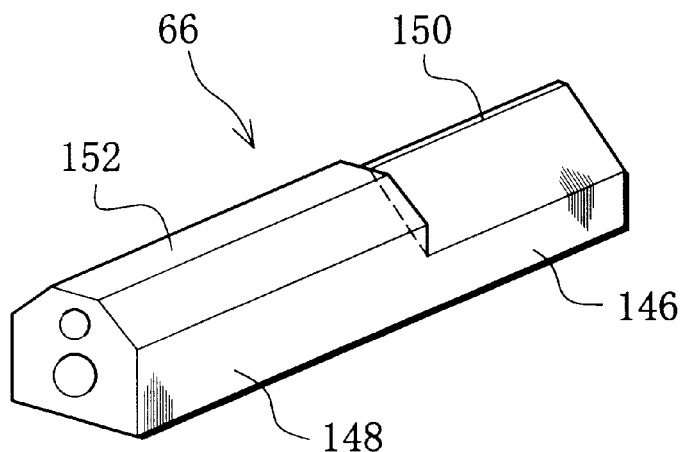
FIGS. 25 to 28 are perspective views showing modifications of the heater block.
Figure 26:
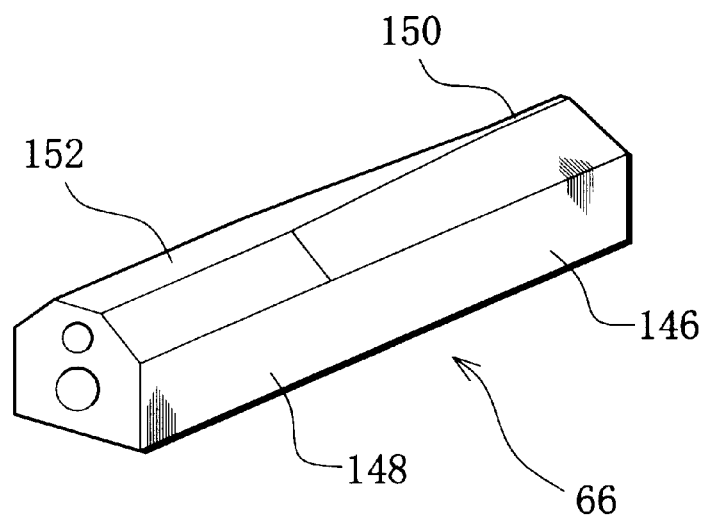

Furthermore, as shown in FIG. 25, the upstream and downstream block parts 146 and 148 of the heater block 66 may be formed as an integral or one-piece body. In this case, the heating ridge 150 of the heater block 66 may have a downstream-side portion whose width gradually increases toward the heating band portion 152, as shown in FIG. 26, such that the heating ridge 150 may be smoothly continuous with the heating band portion 152.

Figure 27:
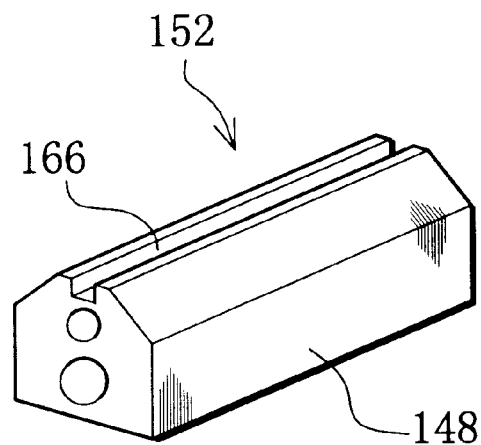
Figure 28:
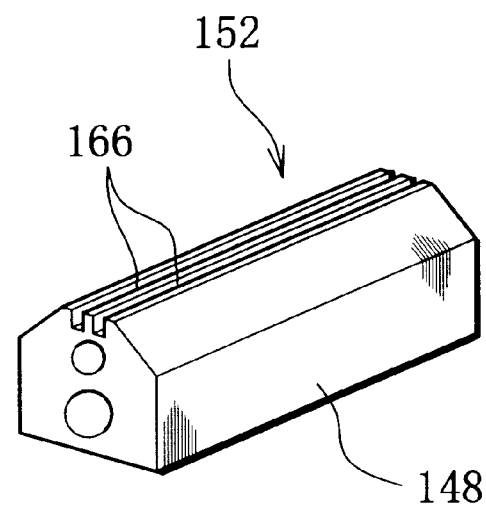

Also, as shown in FIGS. 27 and 28, the heating band portion 152 may have at least one vertical or longitudinal groove 166 cut therein. Such a groove or grooves 166 divide the heating band portion 152 into a plurality of longitudinal sections, and in this case, a plurality of seal bands are formed at the joint of the package web F.

What is claimed is:

1. A sealing apparatus applied to a vertical type forming, filling and closing machine for a flexible package, the machine feeding a cylindrical package web surrounding a filling tube along the filling tube, the package web having a joint at which side edges thereof are in plane contact with each other and which has first and second faces facing in opposite directions, said sealing apparatus comprising:

a heater unit arranged near the filling tube, said heater unit having a heating ridge which extends along the filling tube and with which the first face of the joint of the package web comes into sliding contact, and a heating band member arranged on a downstream side of the heating ridge in a feeding direction of the package web and extending along the filling tube, the heating band member having a greater contact width for contact with the first face of the joint than the heating ridge; and a receiving unit for supporting the joint of the package web, said receiving unit having a pair of guide rails which extends along the heating ridge on opposite sides thereof and with which the second face of the joint comes into sliding contact, the guide rails cooperating with the heating ridge to hold the joint therebetween in a manner such that the joint is elastically deformed toward the guide rails in convex form in cross section, and a flat guide arranged on a downstream side of said pair of guide rails and extending along the filling tube, the flat guide cooperating with the heating band member to hold the joint therebetween.

2. The sealing apparatus according to claim 1, wherein said receiving unit is attached to an outer surface of the filling tube, said sealing apparatus further comprises actuating means for moving said heater unit toward and away from said receiving unit, and when said heater unit is in an advanced position, the joint is held between the heating ridge and said pair of guide rails and subjected to the elastic deformation.

3. The sealing apparatus according to claim 2, wherein said actuating means maintains a predetermined distance between the elastically deformed joint and the filling tube when said heater unit is in the advanced position.

4. The sealing apparatus according to claim 3, wherein said actuating means includes a positioning element for determining the advanced position of said heater unit.

5. The sealing apparatus according to claim 3, wherein said guide rails are coupled to each other via a connecting portion disposed in contact with the filling tube.

6. The sealing apparatus according to claim 1, wherein said heater unit includes an upstream heater block having the heating ridge and a downstream heater block having the heating band member, the upstream and downstream heater blocks being separated from each other.

7. The sealing apparatus according to claim 6, wherein said heating band member has at least one groove extending along the filling tube.

8. The sealing apparatus according to claim 1, wherein said heating ridge has a generally triangular cross-sectional shape.

* * * * *